Figure 1:
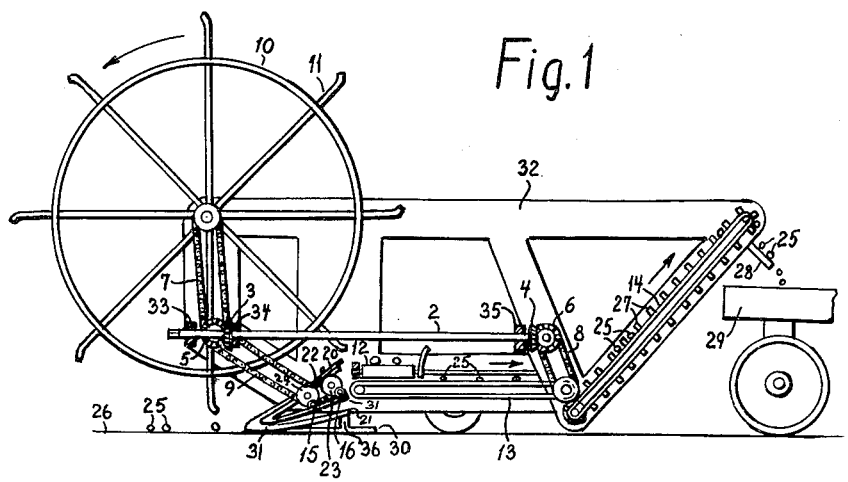

Inventor:

Anker Rasmussen

United States Patent Office 3,205,949
Patented Sept. 14, 1965

3,205,949
ROCK-GATHERING MACHINE
Anker Rasmussen, Terslev, Haslev, Denmark (% Patentbureau Erik Larsen, Reventlowsgade 18, Copenhagen V, Denmark)
Filed July 1, 1963, Ser. No. 291,861
1 Claim. (Cl. 171—63)

This invention relates to a rock-gathering machine for the gathering and removal of loose stones and rocks from the surface of a field or land for agricultural purposes. Such loose stones or rocks may spoil parts on agricultural implements, such as the cutting edge on knives of combines or moving machines, when the latter are used for harvesting the crop of the field.

It is known to have rock-gathering machines with rake or forklike teeth for the loosening and lifting of the stones which are thereafter by prongs on endless chains delivered into a receptacle.

In the latter and other known rock-gathering machines there is the very essential drawback that small stones will often get stuck between the teeth of the rake or forklike member, also when the latter are performing a slight reciprocating movement in which manner small stones often work themselves into a still more stuck position between the teeth. This will cause disturbances in the rock-gathering function of the machine and will result in frequent stops of the work so that they are not very useful. Irrespective of the distance chosen between the teeth there will always be stones of a size capable of getting stuck between the teeth. It is also difficult for the transport members to move lifted stones up along steeply upwardly inclined teeth.

The object of the invention is to provide a rock-gathering machine of the type referred to, in which the said drawback is eliminated or substantially reduced so that the rock-gathering machine will become well applicable for its purpose.

According to the invention, this has been obtained in the way that between broad and stiff obliquely upwardly movable teeth and at a distance from the same there are other thinner and elastic teeth which only at a point are attached to a part or a cross bar on the rock-gathering machine, and which may yield to small stones which have a tendency to get stuck between the teeth seeing that there is thus a comparatively great distance between the stiff teeth so that these small stones will fall down between the teeth but later they can easily be rolled down into the soil and then they will not damage field or harvest implements, while larger stones will be kept loosely lying on the unit of teeth and can easily, by the transport members of the rock-gathering machine, be conveyed to its receptacle, especially if, according to the invention, the teeth are rather low and flatly positioned and the broad and stiff teeth are connected to moving members, which when moved will give said teeth a substantially upwardly and downwardly directed movement and thus will lift the stones up to the members which are to convey them on into the stone receptacle.

Simple and cheap moving members for the movable teeth, which members do not take up too much room beneath the lower lying teeth, are obtained, according to the invention, in the manner that the broad and stiff teeth are attached to substantially tubularly shaped bearings about shafts located in these bearings transversely under the teeth, which shafts are eccentrically attached to wheels that can be rotated.

Figure 2:
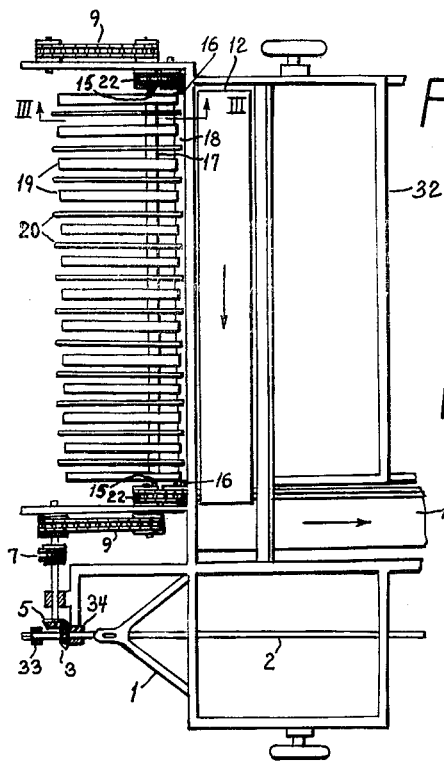

The invention will now be described in detail with reference to the drawing, in which FIG. 1 shows in diagram parts of an embodiment of a rock-gathering machine, according to the invention, in side elevation and partly in vertical section, FIG. 2 part of same, in top view, and FIG. 3 a section along the line III—III in FIG. 2 on a larger scale.

The rock-gathering machine has a machine frame 32 with bearings 33, 34 and 35 for the shafts of the machine. The machine is provided with a drawing member 1 to be attached to a corresponding drawing member on a tractor (not shown) and a shaft 2 to be connected to the power take-off shaft (not shown) of the tractor. To the shaft 2 are attached conical gear wheels 3 and 4 meshing with conical gear wheels 5 and 6 on shafts which by means of V-belt or chain drives 7, 8 and 9 drive a large vertically adjustable wheel 10 with resilient teeth 11 round in the direction of the arrow and band conveyors 12, 13 and 14 in the directions indicated by arrows respectively.

Figure 3:
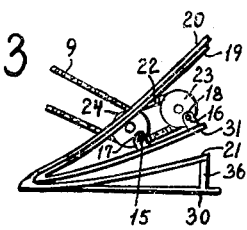

The shafts 15 and 16 are mounted in partially tubularly shaped bushings or bearings 17 and 18, FIG. 3, attached to the lowermost prongs 31 of two cm. broad teeth 19 in the forklike member of the rock-gathering machine. Between the latter are arranged about six mm. thick elastic teeth 20 the lower prongs 21 of which are attached to a cross bar 36 between slip shoes 30 one on either side of the machine. The distance between the teeth 19 and 20 is approximately three cm.

The shafts 15 and 16 are eccentrically attached to chain wheels 23 and 24 mounted in the machine frame. Across the chain wheels 23 and 24 is passed a chain 22. The chain drive 9 is passed across a chain wheel rigidly connected to and concentric with the chain wheel 23. By means of the latter and the chain 22 the chain wheels 23 and 24 may be rotated so that the shafts 15 and 16 can be swung round and the teeth 19 get an obliquely upwardly and downwardly moving direction of e.g. three to four cm.

By this arrangement stones and rocks 25 scraped up from the surface of the soil 26 by the teeth 19 and 20 can be loosely deposited on the same and by the teeth 11 on the wheel 10 be moved up onto the band conveyor 12, by the latter moved to the band conveyor 13 and from the latter fall down between ribs 27 on the band conveyor 14 and from the latter across a short slide 28 fall down into a carriage 29 running behind the rock-gathering machine. At each side of the unit of teeth 19 and 20 there is a slip shoe 30 adapted to keep the teeth 19 and 20 in the height shown.

The parts of the rock-gathering machine may be constructed in another suitable manner than the one shown or described. It is also possible to have other suitable transport members from the teeth 19 and 20 to the receptacle or carriage 29.

What I claim is:

In a rock-gathering machine of the character described, a wheeled supporting structure, a rake or fork-like member having a plurality of relatively broad, stiff teeth, said teeth being transversely spaced, longitudinally inclined and vertically pivotally mounted on a leading portion of said supporting structure, portions of said teeth being in ground contact for gathering stones; means vertically oscillating said teeth; movable means disposed above said teeth impelling the gathered stones upwardly and rearwardly; transport members on said supporting structure, rearwardly of said teeth, in receiving relation therefrom, for conveying the gathered stones and the like to a storage receptacle; relatively thin elastic teeth interposed between said relatively broad teeth and substantially parallel thereto, said elastic teeth being attached to said supporting structure.

References Cited by the Examiner

UNITED STATES PATENTS 1,478,142  12/23  Ortmann _____ 171—101

ABRAHAM G. STONE, *Primary Examiner.*

ANTONIO F. GUIDA, T. GRAHAM CRAVER,
*Examiners.*